United States Patent
Srinivasan et al.

(10) Patent No.: US 10,885,905 B2
(45) Date of Patent: Jan. 5, 2021

(54) PREDICTING USER ACTIONS ON UBIQUITOUS DEVICES

(71) Applicant: Samsung Electronics Co., Ltd., Suwon-si (KR)

(72) Inventors: Vijay Srinivasan, San Jose, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 16/235,983

(22) Filed: Dec. 28, 2018

(65) Prior Publication Data
US 2020/0020326 A1 Jan. 16, 2020

Related U.S. Application Data
(60) Provisional application No. 62/697,963, filed on Jul. 13, 2018.

(51) Int. Cl.
*G10L 15/183* (2013.01)
*G10L 15/197* (2013.01)
(Continued)

(52) U.S. Cl.
CPC ............ *G10L 15/197* (2013.01); *G06N 20/00* (2019.01); *G10L 15/16* (2013.01);
(Continued)

(58) Field of Classification Search
CPC ...... G06N 20/00; G06N 3/0454; G06N 3/006; G06N 3/08; G06N 5/02; G06N 7/005;
(Continued)

(56) References Cited

U.S. PATENT DOCUMENTS 5,751,904 A * 5/1998 Inazumi .................. G10L 15/16
704/232
6,219,657 B1 * 4/2001 Hatayama .......... G06K 9/00335
706/14
(Continued)

FOREIGN PATENT DOCUMENTS

| JP | 2010-146276 A | 7/2010 |
|---|---|---|
| KR | 10-0979516 B1 | 9/2010 |
| KR | 10-2012-0045415 | 5/2012 |

OTHER PUBLICATIONS

International Search Report and Written Opinion dated Oct. 14, 2019 for International Application PCT/KR2019/008431 from National Intellectual Property Administration, pp. 1-8, Korea.
(Continued)

*Primary Examiner* — Vijay B Chawan
(74) *Attorney, Agent, or Firm* — Sherman IP LLP; Kenneth L. Sherman; Steven Laut

(57) ABSTRACT

A method includes that for each model from multiple models, evaluating a model prediction accuracy based on a dataset of a user over a first time duration. The dataset includes a sequence of actions with corresponding contexts based on electronic device interactions. Each model is trained to predict a next action at a time point within the first time duration, based on a first behavior sequence over a first time period from the dataset before the time point, a second behavior sequence over a second time period from the dataset before the time point, and context at the time point. A model is selected from the multiple models based on its model prediction accuracy for the user based on a domain. An action to be initiated at a later time using an electronic device of the user is recommended using the selected model during a second time duration.

20 Claims, 10 Drawing Sheets

(51) Int. Cl.
*G10L 15/18* (2013.01)
*G10L 15/22* (2006.01)
*G10L 15/16* (2006.01)
*G06N 20/00* (2019.01)

(52) U.S. Cl.
CPC .......... *G10L 15/1815* (2013.01); *G10L 15/22* (2013.01); *G10L 2015/223* (2013.01)

(58) Field of Classification Search
CPC ........ G06N 3/004; G06N 3/084; G06N 5/022; G06N 5/027; G06N 7/00; G06F 3/0484; G06F 3/04847; G06F 40/30; G06F 9/542; G06F 11/30; G06F 11/3006; G06F 11/3072; G06F 11/323; G06F 11/3433; G06F 11/3452; G06F 16/176; G10L 15/16; G10L 13/00; G10L 13/043; G10L 15/063; G10L 15/1822; G10L 15/183; G10L 15/22; G10L 15/26; G10L 15/17
USPC ....... 704/232, 246; 705/14.64, 27.1; 706/14, 706/18, 20, 21, 26, 58, 906, 748; 707/769, 804, 999.1, 999.102; 715/708; 719/318
See application file for complete search history.

(56) References Cited

U.S. PATENT DOCUMENTS

| | | | | |
|---|---|---|---|---|
| 7,778,715 B2* | 8/2010 | Kirshenbaum | ...... | G05B 13/048 700/31 |
| 7,937,243 B2* | 5/2011 | Yen | .......... | G06N 5/02 702/179 |
| 8,364,540 B2* | 1/2013 | Soroca | ................ | G06F 16/9577 705/14.64 |
| 9,219,668 B2* | 12/2015 | Johnson | .................. | H04W 4/21 |
| 9,558,452 B2* | 1/2017 | Guiver | ................... | G06Q 10/00 |
| 10,417,225 B2* | 9/2019 | Tankersley | ........ | G06F 16/24528 |
| 2012/0310785 A1* | 12/2012 | Poulin | .................... | G06Q 10/04 705/27.1 |
| 2015/0185995 A1* | 7/2015 | Shoemaker | ........... | G06F 3/0484 715/708 |
| 2016/0019460 A1* | 1/2016 | Li | ..................... | G06F 16/24578 719/318 |
| 2016/0232457 A1* | 8/2016 | Gray | ..................... | G06T 11/206 |
| 2017/0046374 A1* | 2/2017 | Fletcher | ................ | G06F 3/0482 |
| 2017/0140041 A1* | 5/2017 | Dotan-Cohen | ...... | G06Q 10/101 |
| 2018/0190369 A1* | 7/2018 | Wolz | ...................... | G16H 10/20 |
| 2019/0310650 A1* | 10/2019 | Halder | .................... | G06N 3/006 |
| 2019/0324780 A1* | 10/2019 | Zhu | ......................... | G06F 3/167 |

OTHER PUBLICATIONS

Shin, C. et al., "Understanding and Prediction of mobile application usage for smart phones", Proceedings of the 2012 ACM Conference on Ubiquitous Computing, Sep. 5-8, 2012, pp. 173-182, ACM, United States.

Parate, A. et al. "Practical prediction and prefetch for faster access to applications on mobile phones", In Proceedings of the 2013 ACM international joint conference on Pervasive and ubiquitous computing, Sep. 8-12, 2013, pp. 275-284, ACM, United States.

* cited by examiner

900

910 — For Each Model From A Plurality Of Models, Evaluating A Model Prediction Accuracy Based On A Dataset Of A User Over A First Time Duration (The Dataset Comprises A Sequence Of Actions With Corresponding Contexts Based On Electronic Device Interactions, And Each Model Is Trained To Predict A Next Action At A Time Point Within The First Time Duration, Based On A First Behavior Sequence Over A First Time Period From The Dataset Before The Time Point, A Second Behavior Sequence Over A Second Time Period From The Dataset Before The Time Point, And Context At The Time Point)

920 — Selecting A Model From The Plurality Of Models Based On Its Model Prediction Accuracy For The User Based On A Domain 930 — Recommending An Action To Be Initiated At A Later Time Using An Electronic Device Of The User Using The Selected Model During A Second Time Duration

FIG. 9

PREDICTING USER ACTIONS ON UBIQUITOUS DEVICES

CROSS-REFERENCE TO RELATED APPLICATIONS

This application claims the priority benefit of U.S. Provisional Patent Application No. 62/697,963, filed on Jul. 13, 2018, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to actions on ubiquitous devices, in particular, to predicting next actions on ubiquitous devices based on context-aware recurrent modeling.

BACKGROUND

Users perform numerous actions such as ordering food, watching movies, and playing games on ubiquitous computing devices such as smartphones, smart speakers and smart televisions (TVs). Ubiquitous devices increasingly collect detailed device usage logs such as apps used or content viewed along with user context logs such as location and physical activities; these logs are typically used to personalize the device better and provide feedback to the user on her location timeline, physical activities, or device usage patterns for her digital well-being. Given the recent advances in recurrent models such as GRUs (Gated Recurrent Units) and LSTMs (Long-Short Term Memory models) for population-level recommendation systems, an exciting direction that remains unexplored is how to build personal recurrent models appropriately incorporated with contextual features to predict user actions on ubiquitous devices.

SUMMARY

One or more embodiments generally relate to predicting next actions on ubiquitous devices based on evaluation of multiple models and selection of a context-aware recurrent model. In one embodiment, a method includes that for each model from multiple models, evaluating a model prediction accuracy based on a dataset of a user over a first time duration. The dataset includes a sequence of actions with corresponding contexts based on electronic device interactions. Each model is trained to predict a next action at a time point within the first time duration, based on a first behavior sequence over a first time period from the dataset before the time point, a second behavior sequence over a second time period from the dataset before the time point, and context at the time point. A model is selected from the multiple models based on its model prediction accuracy for the user based on a domain. An action to be initiated at a later time using an electronic device of the user is recommended using the selected model during a second time duration.

In some embodiments, an electronic device includes a memory storing instructions. At least one processor executes the instructions including a process configured to: for each model from a plurality of models, evaluate a model prediction accuracy based on a dataset of a user over a first time duration, wherein: the dataset comprises a sequence of actions with corresponding contexts based on electronic device interactions, and each model is trained to predict a next action at a time point within the first time duration, based on a first behavior sequence over a first time period from the dataset before the time point, a second behavior sequence over a second time period from the dataset before the time point, and context at the time point; select a model from the plurality of models based on its model prediction accuracy for the user based on a domain; and recommend an action to be initiated at a later time using the electronic device using the selected model during a second time duration.

In one or more embodiments, a non-transitory processor-readable medium that includes a program that when executed by a processor performing a method that includes for each model from multiple models, evaluating a model prediction accuracy based on a dataset of a user over a first time duration. The dataset includes a sequence of actions with corresponding contexts based on electronic device interactions. Each model is trained to predict a next action at a time point within the first time duration, based on a first behavior sequence over a first time period from the dataset before the time point, a second behavior sequence over a second time period from the dataset before the time point, and context at the time point. A model is selected from the multiple models based on its model prediction accuracy for the user based on a domain. An action to be initiated at a later time using an electronic device of the user is recommended using the selected model during a second time duration.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 9 shows a block diagram of a process for predicting next actions on ubiquitous devices based on context-aware recurrent modeling, according to some embodiments.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for predicting next actions on ubiquitous devices based on evaluation of multiple models and selection of a context-aware recurrent model. In some embodiments, a method includes that for each model from multiple models, evaluating a model prediction accuracy based on a dataset of a user over a first time duration. The dataset includes a sequence of actions with corresponding contexts based on electronic device interactions. Each model is trained to predict a next action at a time point within the first time duration, based on a first behavior sequence over a first time period from the dataset before the time point, a second behavior sequence over a second time period from the dataset before the time point, and context at the time point. A model is selected from the multiple models based on its model prediction accuracy for the user based on a domain. An action to be initiated at a later time using an electronic device of the user is recommended using the selected model during a second time duration.

Figure 1:
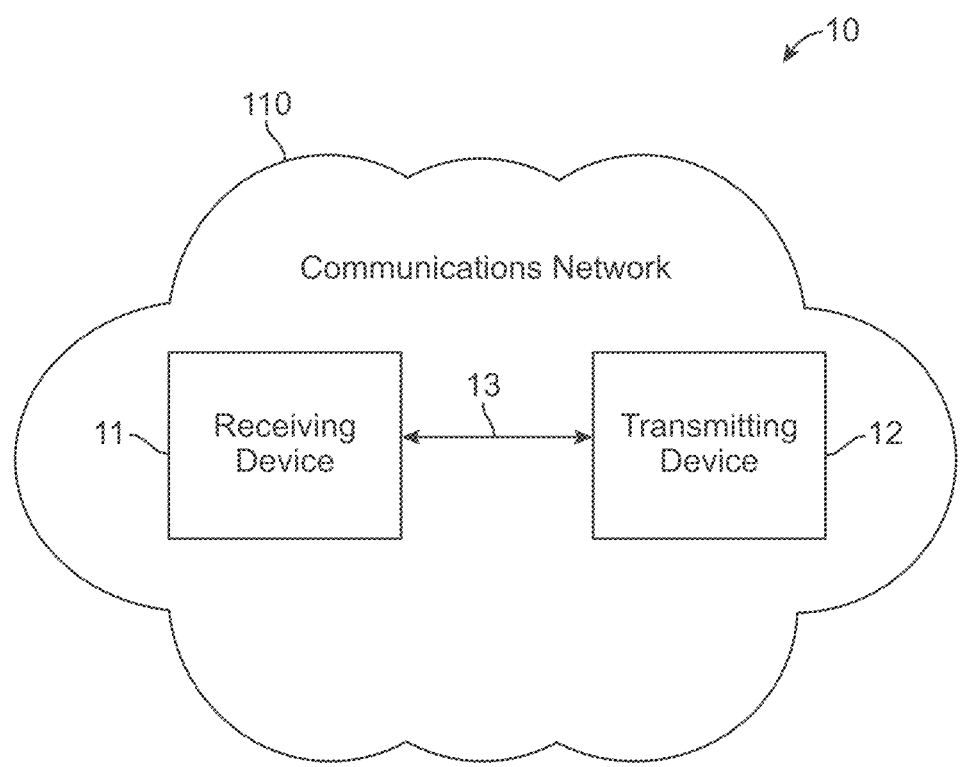
FIG. 1 shows a schematic view of a communications system, according to some embodiments.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to devices including a voice assistant (personal assistant, virtual assistant, etc.) such as mobile telephone devices, television (TV) systems, smart TV systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., data and control messaging, e-mails, text messages, media messages), video communication, or combinations of these (e.g., video conferences).

Figure 2:
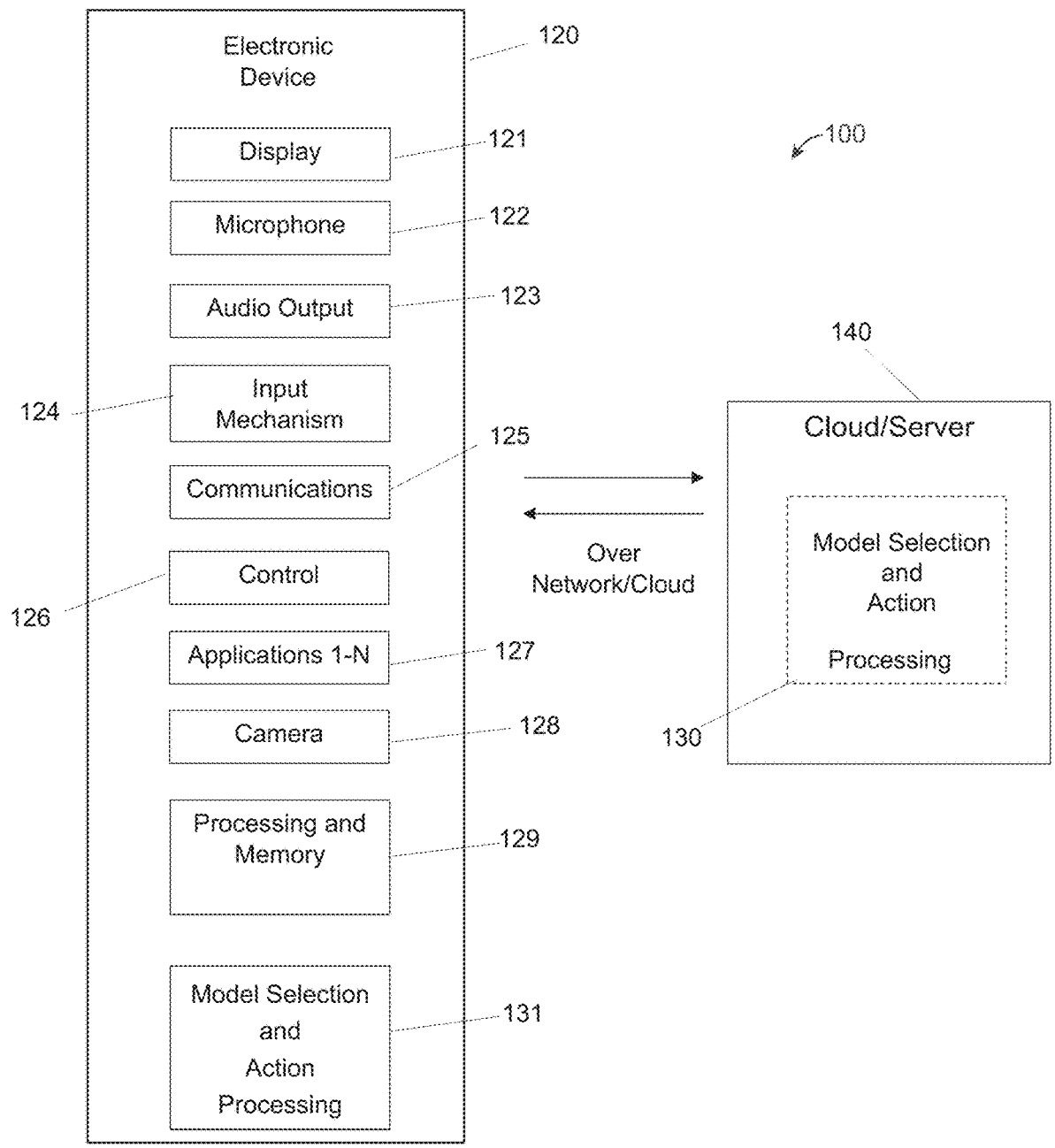
FIG. 2 shows a block diagram of architecture for a system including an electronic device and a cloud or server environment, that is capable of performing individually or in combination, predicting next actions on ubiquitous devices based on context-aware recurrent modeling processing, according to some embodiments.

FIG. 2 shows a block diagram of an architecture for a system 100 that is capable of performing predicting next actions on ubiquitous devices based on context-aware recurrent modeling using an electronic device 120 (e.g., mobile telephone devices, TV systems, cameras, camcorders, a device with audio video capabilities, tablets, pad devices, wearable devices, smart appliances, smart picture frames, smart lighting, etc.), a cloud or server 140, or a combination of the electronic device 120 and the cloud computing (e.g., shared pools of configurable computing system resources and higher-level services, etc.) or server (e.g., a computer, device, or program that manages network resources, etc.) 140. Both the transmitting device 12 (FIG. 1) and receiving device 11 may include some or all of the features of the electronics device 120. In some embodiments, the electronic device 120 may comprise a display 121, a microphone 122, an audio output 123, an input mechanism 124, communications circuitry 125, control circuitry 126, a camera 128, processing and memory 129, model selection and action processing 130 and/or 131 (for processing on the electronic device 120, on the cloud/server 140, on a combination of the electronic device 120 and the cloud/server 140, communicating with the communications circuitry 125 to obtain/provide information thereof with the cloud or server 140; and may include any of the processing for, but not limited to, the examples as described below), and any other suitable components. Applications 1-N 127 are provided and may be obtained from a cloud or server 140, a communications network 110, (FIG. 1) etc., where N is a positive integer equal to or greater than 1.

In some embodiments, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In some embodiments, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In some embodiments, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In some embodiments, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., or a touch screen. The input mechanism 124 may include a multi-touch screen.

In some embodiments, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In some embodiments, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, one or more processors (e.g., in processing and memory 129) may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In some embodiments, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, a recommender application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In some embodiments, the camera module 128 comprises one or more camera devices that include functionality for capturing still and video images, editing functionality, communication interoperability for sending, sharing, etc. photos/videos, etc.

In some embodiments, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

In some embodiments, predicting user tasks ahead of time has a variety of powerful applications, including more contextually relevant targeted ads, convenient task shortcuts on devices, and content or app pre-loading to reduce latency. Users perform a variety of daily actions on ubiquitous devices such as electronic devices 120 (FIG. 2) including, but not limited to smart phones, smart TVs, smart speakers, etc. For example, people use smartphones for diverse actions such as playing games, browsing for information, ordering food, getting directions, and communicating on social media. Similarly, people use smart TVs to play games and view diverse content such as daily news, thriller movies, live sports, weekly comedy shows, etc. Ubiquitous devices increasingly collect detailed device usage logs such as apps used or content viewed along with user context logs such as location and physical activities; these logs are typically used to personalize the device and provide feedback to the user on their location timeline, physical activities, or device usage patterns for their digital wellbeing.

An accurate prediction of a user's next action on the ubiquitous device is an excellent input for more contextually relevant recommendations and targeted ads; for example, recommend the latest hit action movie when the user is likely to watch an action movie, or recommend a dining app when the user is likely to order food in the near future. Predictive pre-loading of apps, games and content can be performed to reduce latency based on a prediction of the user's next action; for example, pre-load a particular game to reduce multiple seconds of loading time if it is predicted that the user is likely to play the particular game. Action prediction can also be used to display convenient predictive action shortcuts to the end user based on a prediction of the user's current action needs, thereby reducing the user effort involved in searching for and finding the relevant action shortcut. A key requirement for the above applications is that the personal contextual-aware recurrent model and prediction processing 300 achieves high prediction accuracy.

An accurate prediction of the next action of the user can also help resolve the ambiguity of an utterance from the user for a voice assistant. For example, when the user asks for directions to "Mike's," action prediction can help disambiguate if "Mike's" refers to the user's friend or a burger restaurant chain. For example, based on the user's past behavior and current context (e.g., 2 PM at work on a Saturday), the personal contextual-aware recurrent model and prediction processing 300 predicts that the user is likely searching for directions to his friend Mike's home, and resolves "Mike" to refer to the user's friend. In a different context (e.g., 8 PM on a weekday), the personal contextual-aware recurrent model and prediction processing 300 predicts that the user is likely searching for directions to "Mike's" burger restaurant for dinner, and resolves "Mike's" to refer to the burger restaurant.

Figure 3:
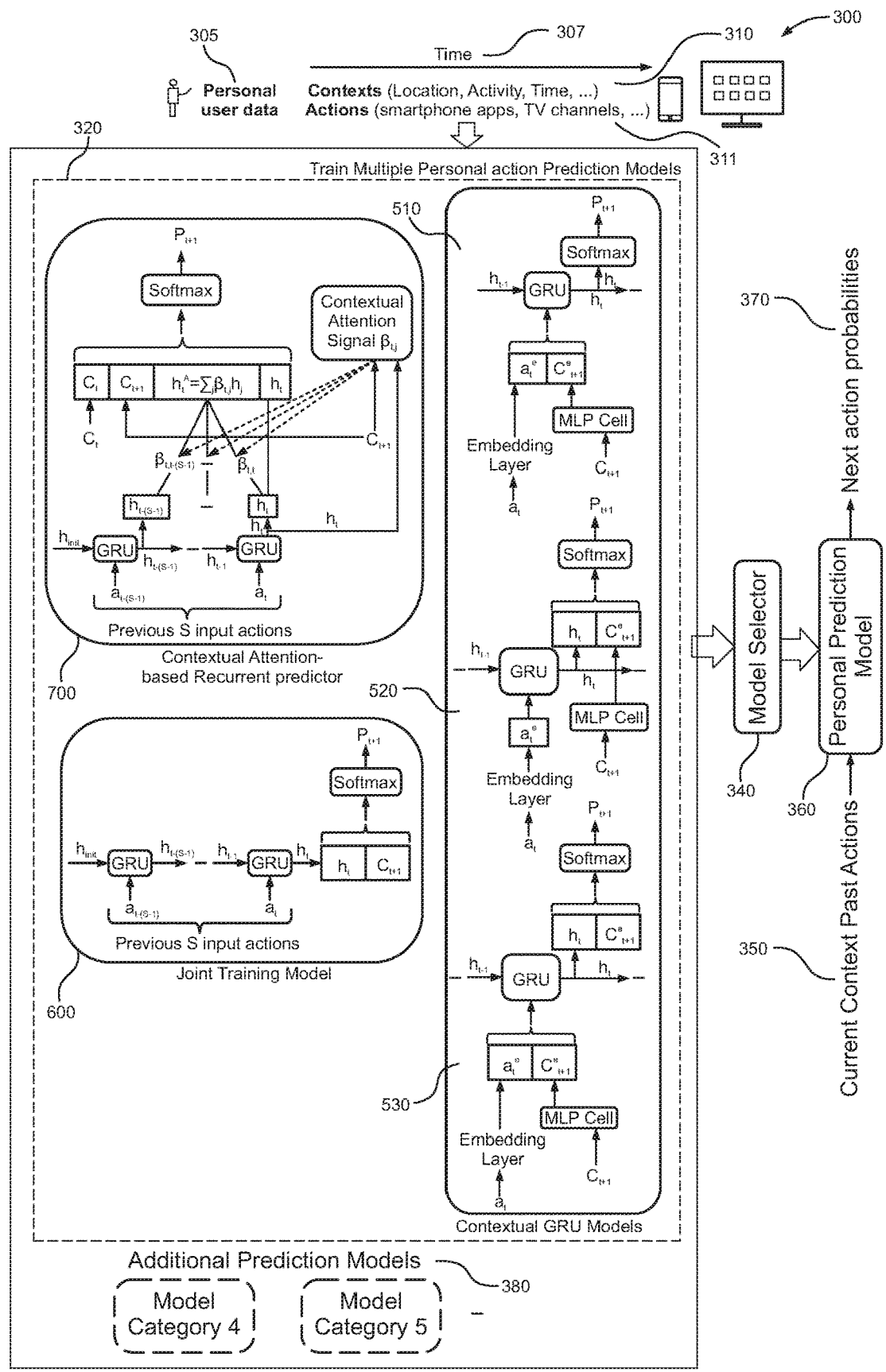
FIG. 3 shows a high-level flow diagram for selection of a personal contextual-aware recurrent model and prediction processing, according to some embodiments.

FIG. 3 shows a high-level flow diagram for selection of a personal contextual-aware recurrent model and prediction processing 300, according to some embodiments. In some embodiments, the personal contextual-aware recurrent model and prediction processing 300 includes a suite of three major categories of context-aware recurrent models 320: contextual gated recurrent unit (GRU) models 510 (see also, FIG. 5A), 520 (see also, FIG. 5B) and 530 (see also, FIG. 5C) that incorporate context at each recurrent step, a joint training model 600 (see also, FIG. 6) approach, and a contextual attention-based recurrent predictor 700 (see also, FIG. 7) built on top of the joint training model 600 approach. The three categories of models offer a different degree of model complexity and number of parameters, which needs to match the behavior complexity and training data available for each individual user. Therefore, unlike conventional population-level recommendation systems which aim to design a single best performing recommendation model over the population dataset, in some embodiments the personal contextual-aware recurrent model and prediction processing 300 selects the best personal context-aware recurrent model for each user and prediction target. Overall, the contextual attention-based recurrent predictor 700 model is selected most frequently for individual users across multiple prediction targets and datasets, and also improves the interpretability of the prediction model. Unlike conventional population-based recommender algorithms which aim to design a single best performing recurrent model, the personal contextual-aware recurrent model and prediction processing 300 trains a suite of three categories of context-aware recurrent models, and the model selector 340 selects the best personal (context-aware recurrent) model 360 (using the current context and past actions information 350) for each user and prediction target (next action probabilities 370). In one or more embodiments, the training data input to the personal contextual-aware recurrent model and prediction processing 300 includes personal user data 305, contexts information 310 (e.g., location, activity, current time, etc.) and actions (e.g., smartphone app use, TV channels watched, etc.) 311 over time 307.

In some embodiments, each of the context-aware recurrent models 320 provides a distinctive method of combining short term sequential behavior, long term sequential behavior, and the current context to predict the next action of the user. For example, the contextual attention-based recurrent predictor 700 uses the current context to decide how much importance to assign to the short term and long term user behavior. The joint training model 600 combines the current context with a representation of the user's short term and long term sequential behavior to predict the next action of the user. As another example, each of the contextual recurrent models 510, 520, and 530 adds context information to each step of the recurrent network, which models the short term and long term behavior of the user.

In some embodiments, for each user, each of the context-aware recurrent models 320 adapts importance among the first behavior sequence (e.g., for a first time window: contexts information 310, actions 311), the second behavior sequence (e.g., for a second time window: contexts information 310, actions 311) and the context at the time point based on their interplay for each user. For example, for user A, the next action of the user may be largely determined by the current context; thus, the context-aware recurrent models 320 assign a high importance to the current context in predicting the next action of the user. For example, for another user B, the next action of the user may be determined based on short term behavior in context X, based on long term behavior in context Y, and based only on the current context in context Z. The context-aware recurrent models 320 assign the appropriate importance in each of the contexts X, Y, and Z to accurately predict the next action of the user. Furthermore, the context-aware recurrent models 320 are continuously updated to reflect changes in a user's behavior. For example, for user A, based on initial behavior, in some embodiments the personal contextual-aware recurrent model and prediction processing 300 may assign a high importance to current context. Over time, to reflect changes in user A's behavior, in some embodiments the personal contextual-aware recurrent model and prediction processing 300 may assign a higher importance to short term behavior.

In some embodiments for the personal contextual-aware recurrent model and prediction processing 300, the three major categories of context-aware recurrent models 320 are not exhaustive, and alternative embodiments may include additional personal (prediction) models 380 such as model categories 4 and 5, which may be trained and input to the model selector 340. For example, in model category 4, instead of using the GRU recurrent update, an LSTM model may be used instead. As another example embodiment, in model category 5, instead of recurrent connections in the contextual attention-based recurrent predictor 700 model (see also, FIG. 7), a contextual attention priority model over the last S user action embeddings may be employed. In practice, prediction accuracy improves greatly when selecting between the three major categories of context-aware recurrent models 320. As additional prediction models are added, the added benefit in improving prediction accuracy is negligible when considering the additional processing required to train other similar prediction models. Therefore, one or more embodiments focus on the three major categories of context-aware recurrent models 320.

In one or more embodiments, the personal contextual-aware recurrent model and prediction processing 300 significantly improves the prediction accuracy of existing baseline approaches for predicting user actions on ubiquitous devices. For TV prediction tasks, the contextual attention-based recurrent predictor 700 model is most often preferred, although the contextual GRU models 510, 520 and 530 work best for a non-trivial proportion of users. For the smartphone prediction tasks, even though the contextual attention-based recurrent predictor 700 model is generally most preferred, for a number of users the model selector 340 selects the joint training model 600 and contextual GRU models 510, 520 and 530. In some embodiments, several simple modifications to the basic contextual recurrent architecture are used to address the sparse training data problem in personal action prediction. In one or more embodiments, a joint training approach is used to overcome the limitations of contextual GRU models 510, 520 and 530 for some users in handling low volume personal training data and high dimensional context features for action prediction. In some embodiments, the contextual attention-based recurrent predictor 700 achieves the best accuracy across multiple prediction targets based on next action probabilities 370 and datasets (e.g., current context and past actions 350), and also improves the interpretability of the personal (context-aware recurrent) model 360.

In some embodiments, the three major categories of context-aware recurrent models 320 offer a different degree of model complexity and number of parameters, which needs to match the behavior complexity and training data available for each individual user. Therefore, unlike conventional population-level recommendation systems which aim to design a single best performing recommendation model over the population dataset, the personal contextual-aware recurrent model and prediction processing 300 selects the best personal (context-aware recurrent) model 360 for each user and prediction target based on next action probabilities 370. In one or more embodiments, the three major categories of context-aware recurrent models 320 use multiple hyperparameters (e.g., dimension of GRU state $|h_t|$ (e.g., 50, 100, 150, or 200), dimension of context embedding vector $|c_t^e|$ (e.g., 15, 50, or 100), session length S (e.g., 15, 30, 50, or 70), and latent vector length L from the contextual attention-based recurrent predictor 700 model (e.g., 50, 100, or 150)). Multiple values are explored for each hyperparameter, and the hyper-parameters that achieve the highest prediction accuracy are chosen for each model and user.

In some embodiments, upon implementing the contextual GRU models 510, 520 and 530 on a device (e.g., electronic device 120, FIG. 2), a continuous streaming sequence of input (contexts information 310, actions 311) pairs are input to the selected contextual GRU model, where the action 311 may refer to the smartphone app used or TV channel viewed by the user. For example, in a smartphone app prediction application, as the continuous stream of (contexts information 310, actions 311) pairs is input to the selected contextual GRU model, the contextual GRU model automatically decides how best to use the short-term app usage sequence (for example, last 3 apps) and the long-term app usage behavior (for example, last 30 apps used) to predict the next app of the user. Since the selected contextual GRU model automatically handles how to combine short-term and long-term user behavior to predict the next action, the personal contextual-aware recurrent model and prediction processing 300 does not need to explicitly fix any short-term or long-term window length hyper-parameters. In one or more embodiments, for the joint training model 600 (see also, FIG. 6) and the contextual attention-based recurrent predictor model 700 (see also, FIG. 7), the personal contextual-aware recurrent model and prediction processing 300 uses the session length hyper-parameter S to determine the maximum length of the sequence of (contexts information 310, actions 311) pairs that are input to the context-aware recurrent model at each prediction step. In one example embodiment, setting the session length hyper-parameter S to be 50 (i.e., last 50 actions) achieves high prediction accuracy for most users and prediction targets. For example, for the smartphone app prediction application, the context-aware recurrent models (joint training model 600 and contextual attention-based recurrent predictor model 700) automatically decide how to use short-term user behavior (e.g., last 3 apps, etc.) and long-term user behavior (e.g., last 40 apps used, etc.) to predict the next app of the user. Similar to the contextual GRU models 510, 520 and 530, for the context-aware recurrent models (joint training model 600 and contextual attention-based recurrent predictor model 700), there is no need to explicitly fix any short-term or long-term window hyper-parameter since the recurrent model automatically decides how to combine short-term and long-term user behavior to predict the next action; for the joint training model 600 and contextual attention-based recurrent predictor model 700, the personal contextual-aware recurrent model and prediction processing 300 only empirically fixes the maximum length of past actions S observed by the model at each prediction step.

Figure 4:
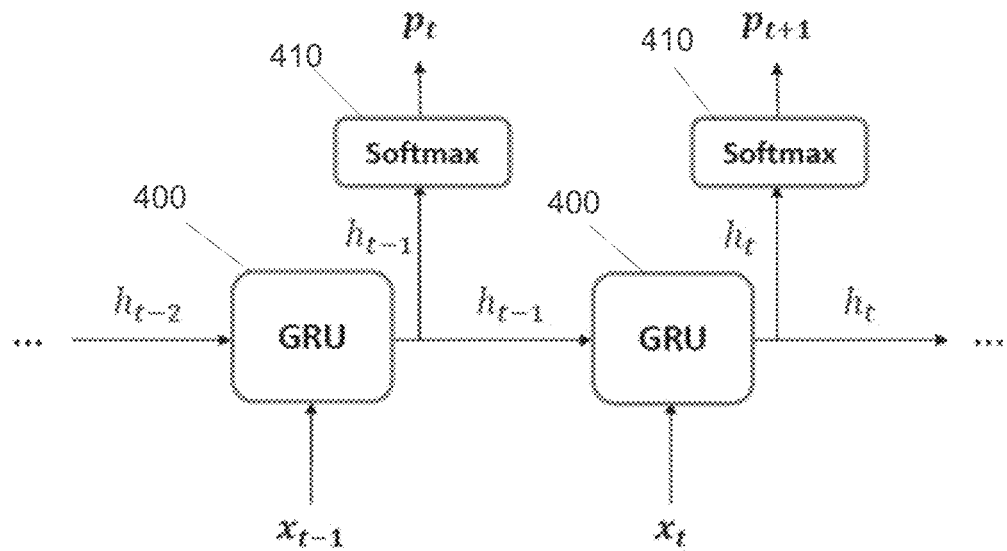
FIG. 4 shows a gated recurrent unit (GRU) unit underlying predictive models, according to some embodiments.

FIG. 4 shows basic GRUs 400 that underlie predictive models, according to some embodiments. In one or more embodiments, the hidden state $h_t$ of the GRU 400 is input to a softmax activation function 410 to compute a probability distribution $p_{t+1}$ for the next item in the sequence. The input is a temporally ordered sequence of paired action context inputs A={$(a_t, c_t)$}, t=1 ... T, where $a_t$ represents one-hot encoded action class of the user at time t, and $c_t$ denotes the one-hot encoded context feature vector of the user at time t. An example of action $a_t$ is launching a food delivery app, and an example of context vector $c_t$ is [at home, 9-10 PM, weekday, Monday, connected to Wi-Fi network 'Orange']. Given this input, a goal is to model the probability of action at of the user at any time t, given context $c_t$ and the history of past actions and contexts 350 of the user {$(a_{<t}, c_{<t})$}. Thus, one goal is to model the conditional probability distribution $P(a_t|c_t, a_{<t}, c_{<t})$ using the three major categories of context-aware recurrent models 320.

In one or more embodiments, the GRU 400 outputs a sequence of hidden states {$h_t$}, t=1 ... T based on a sequence of input items {$x_t$}, t=1 ... T. GRU gates essentially learn when and by how much to update the hidden state of the unit. In some embodiments, the hidden state $h_t$ is typically input to a softmax activation function 410 to output a probability distribution $p_{t+1}$ over the next item $x_{t+1}$. For reference, equations 1 to 4 below denote how the GRU 400 computes the hidden state $h_t$ from input $x_t$ and the previous hidden state $h_{t-1}$. The reset gate $r_t$ is given by:

$$r_t = \sigma(W_r x_t + U_r h_{t-1}) \tag{1}$$

The candidate activation $\hat{h}_t$ is computed as follows:

$$\hat{h}_t = \tanh(W_h x_t + U_h(r_t \circ h_{t-1})) \tag{2}$$

The update gate is computed as:

$$z_t = \sigma(W_z x_t + U_z h_{t-1}) \tag{3}$$

Finally, the activation of the GRU 400 is computed as a linear interpolation between the previous activation $h_{t-1}$ and the candidate activation $\hat{h}_t$:

$$h_t = (1-z_t)h_{t-1} + z_t \hat{h}_t \tag{4}$$

In some embodiments, the softmax activation function 410 performs two operations as shown below in equations 5-6. First, the softmax activation function 410 transforms the input hidden state to the desired output dimension using the weight matrix $W_o \in R^{H \times I}$, where H is the dimension of the hidden state, and I represents the number of distinct input items. Second, the softmax activation function 410 applies the softmax activation function to transform the output to a probability distribution $p_{t+1}$ over the next predicted item in the sequence.

$$o_t = W_o^T h_t + b_o \tag{5}$$

$$p_{t+1} = \left[ \frac{\exp(o_{t,1})}{\sum_k \exp(0_{t,k})}, \ldots, \frac{\exp(0_{t,I})}{\sum_k \exp(0_{t,k})} \right] \tag{6}$$

Figures 5A, 5B, 5C:
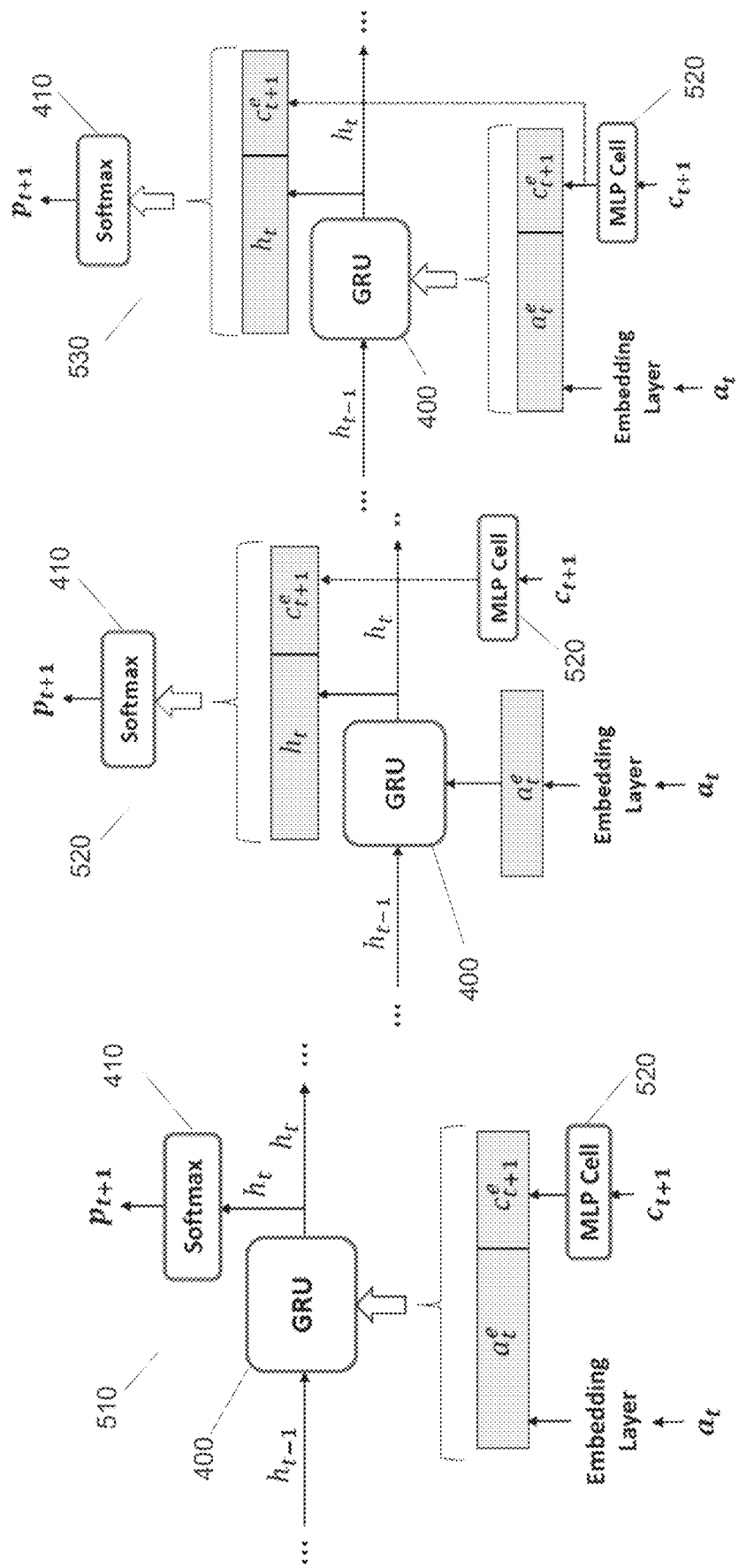
FIG. 5A shows a contextual GRU predictor with concatenation at an input, according to some embodiments.
FIG. 5B shows a contextual GRU predictor with concatenation at an output, according to some embodiments.
FIG. 5C shows a contextual GRU predictor with concatenation at an input and output, according to some embodiments.

FIG. 5A shows a contextual GRU predictor 510 with concatenation at an input, according to some embodiments. A widely used technique to incorporate context at each step of recurrent networks such as GRUs is to concatenate the context vector to the input item vector before input to the GRU. In general, simply concatenating the context vector to the input item vector significantly increases the size of the input vector to the GRU; such an approach works well given large scale training data. However, for personalized user action prediction, the training data coverage of various user contexts and actions is sparse. To solve this problem, in some embodiments several modifications are made to the conventional contextual recurrent model resulting in the contextual GRU predictor 510. First, the input action at a, time t is mapped to a lower-dimensional embedding vector at; this performs better than using a sparse one-hot encoding of the input action at. Second, instead of directly concatenating the one-hot encoded sparse context vector $c_{t+1}$, $c_{t+1}$ is input to a Multi-Layer Perceptron (MLP) cell 510 to reduce the sparse context vector into a low dimensional dense feature representation $c_{t+1}^e$. The length of $c_{t+1}$ is typically greater than 100, while the length of $c_{t+1}^e$ that works best is only 15. In one or more embodiments, a simple MLP cell 510 without any hidden layers is implemented, and $c_{t+1}^e$ is computed as follows:

$$c_{t+1}^e = f(W_c ct+1 + b_c) \tag{7}$$

where $ct+1 \in R^C$ is the sparse one hot encoded input context vector, $c_{t+1}^e \in R^n$ denotes the transformed dense context feature representation, $W_c \in R^{n \times C}$ is a weight matrix, and $b_c \in R^n$ is the bias vector.

In some embodiments, setting f(.) to be the sigmoid activation function performs best in terms of prediction accuracy. Thus, the input to the GRU 400 is the concatenation $[a_t^e; c_{t+1}^e]$ of the input action embedding and the dense context feature representation. To further address the sparse training data problem for personalized action prediction, it is observed that adding L2-regularization to the loss function for the GRU 400 significantly improves prediction accuracy. In particular, in some embodiments the categorical cross-entropy loss function shown below is implemented with a regularization term added for the GRU weight matrices.

$$L = \Sigma_{i=2}^K \Sigma_{j=1}^l (a_{t+1}[l] * \log(p_{t+1}[j])) + \lambda \theta \tag{8}$$

In some embodiments, in equation 8, $a_{t+1}$ is the one hot encoded ground truth user action vector at context $c_{j+1}$, $p_{t+1}$ is the predicted user action vector output by the contextual GRU predictor 510, K is the number of training examples, 1 is the number of possible user actions, λ is the regularization constant, and θ denotes the sum of L2-norm of GRU weight matrices $W_r$, $W_h$ and $W_z$ from equations 1-4. With the above modifications, it is observed that the contextual GRU predictor 510 achieves significantly higher prediction accuracy compared to a naive model that concatenates the raw input action and context one hot encoding vectors. Further, it is observed that the contextual GRU predictor 510 shows only one example of incorporating context at each step of the GRU 400, by concatenating the context feature representation to the input action embedding input to the GRU 400. Two additional contextual GRU models (contextual GRU predictor 520, FIG. 5B and contextual GRU predictor 530, FIG. 5C) are implemented, depending on how the context is incorporated into the GRU 400, according to some embodiments.

FIG. 5B shows a contextual GRU predictor 520 with concatenation at an output, according to some embodiments. In one or more embodiments, a GRU model is considered where only the action embeddings are input to the GRU 400, and the context feature representation is concatenated to the hidden state $h_t$ output by the GRU 400; this concatenated vector $[h_t; c_{t+1}^e]$ is then input to the softmax activation function 410 to output the action prediction vector $p_{t+1}$.

FIG. 5C shows a contextual GRU predictor 530 with concatenation at an input and output, according to some embodiments. In some embodiments, a third GRU model (the contextual GRU predictor 530) is considered where the context feature representation is concatenated both to the input portion and to the hidden state output by the GRU 400, combining the GRU architectures of the contextual GRU predictor 510 (FIG. 5A) and the contextual GRU predictor 520 (FIG. 5B). In some embodiments, the variant of the contextual GRU approaches that works best depends on the user and prediction target under consideration. For some users and prediction targets, it is observed that concatenating context to the GRU input works best (a contextual GRU predictor 510); for other users, concatenating context to both the input and output modules works best (a contextual GRU predictor 530). The intuition behind this observation is that each of these models offers a different level of model complexity and number of model parameters, which needs to match the complexity and variation in user behavior observed in each user's personal dataset.

Figure 6:
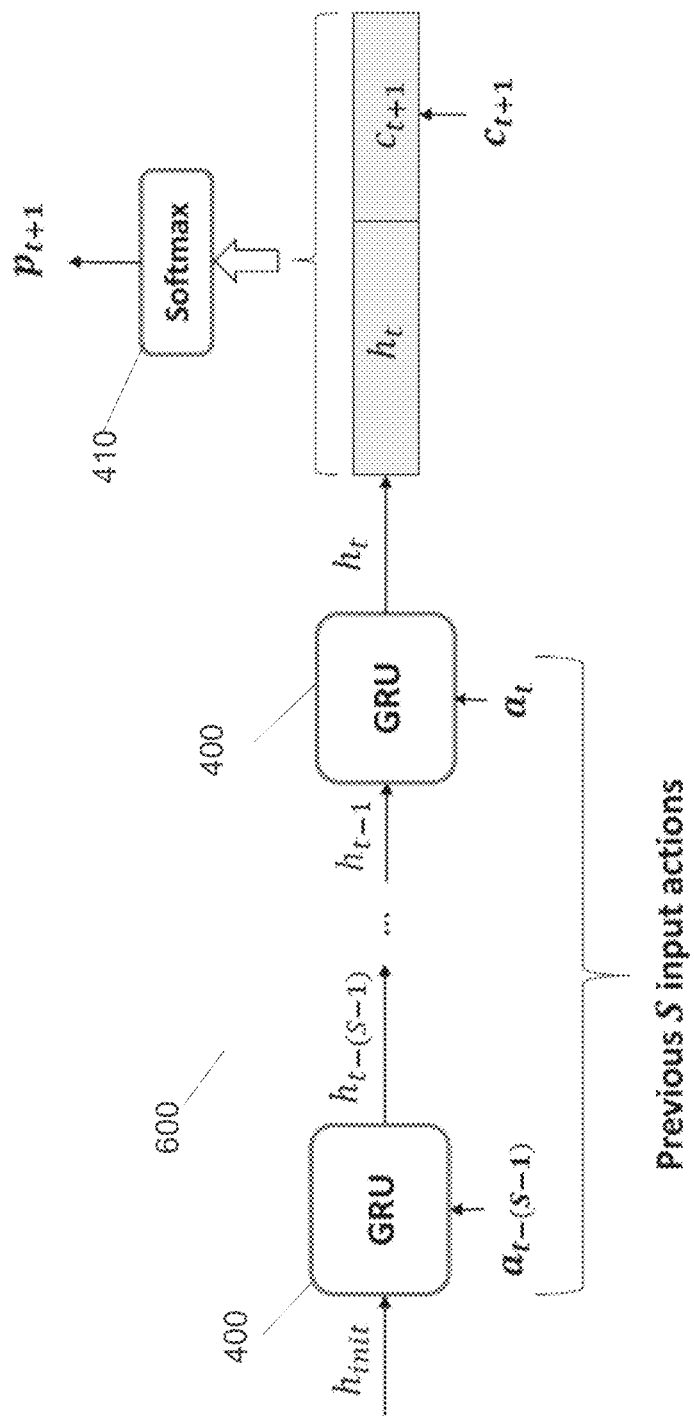
FIG. 6 shows a joint training network architecture to combine contextual features with a final GRU hidden state, according to some embodiments.

FIG. 6 shows a joint training network architecture 600 to combine contextual features with a final GRU hidden state, according to some embodiments. In one or more embodiments, the final GRU hidden state $h_t$ represents the user's sequential behavior based on the previous S actions, where S denotes the session length hyper-parameter. Concatenating the context vector to the input action vector at each step of the GRU network works well given large scale training data. However, for personalized action prediction, the training data coverage of diverse user actions and contexts is sparse. To solve this problem, in some embodiments the action and context data are transformed into low dimensional feature embeddings and added regularization to the GRU 400 weight matrices. In one or more embodiments, to address the sparse data problem the joint training network architecture 600 is leveraged. Instead of concatenating context to the one hot encoded action vector at each step of GRU processing, GRU 400 is trained to operate only on a sequence of S input user actions (where S is the session length hyper-parameter). After processing the sequence of S input actions, the final hidden state $h_t$ of the GRU 400 is used as an encoding of the user's sequential behavior. This final hidden state $h_t$ is then concatenated with the context vector $c_{t+1}$. The concatenated vector [$h_t$; $c_{t+1}$] is then input to the softmax activation function 410 to output a probability distribution $p_{t+1}$ over the user action at time t+1. It must be noted that the joint training network architecture 600 is different from an ensemble approach that combines the output predictions of a GRU and a contextual predictor.

Unlike the contextual GRU models 510 (FIG. 5A), 520 (FIG. 5B) and 530 (FIG. 5C), the joint training network architecture 600 does not require any L2-regularization or a transformation of the one hot encoded input action and context vectors to a dense feature embedding to achieve high prediction accuracy. This is because the joint training network architecture 600 inherently reduces the complexity of the contextual GRU model which concatenates context at each step of the GRU 400. One drawback of the joint training network architecture 600 approach is that it only uses context vector $c_{t+1}$ and does not incorporate prior contexts $c_{<(t+1)}$ in making the prediction $p_{t+1}$. In spite of this drawback, the joint training network architecture 600 approach is the best model for a non-trivial proportion of mobile users; one reason for this is that the context vector for mobile users is more complex and high dimensional, including diverse place and activity features. The joint training network architecture 600 approach effectively mitigates the over-fitting problem caused by such high dimensional contextual input features and sparse training data. In some embodiments, for problems such as TV content genre or channel prediction with low dimensional temporal context features such as time of day and day of week, the GRU models which incorporate context at each step perform better than the joint training network architecture 600 approach.

Figure 7:
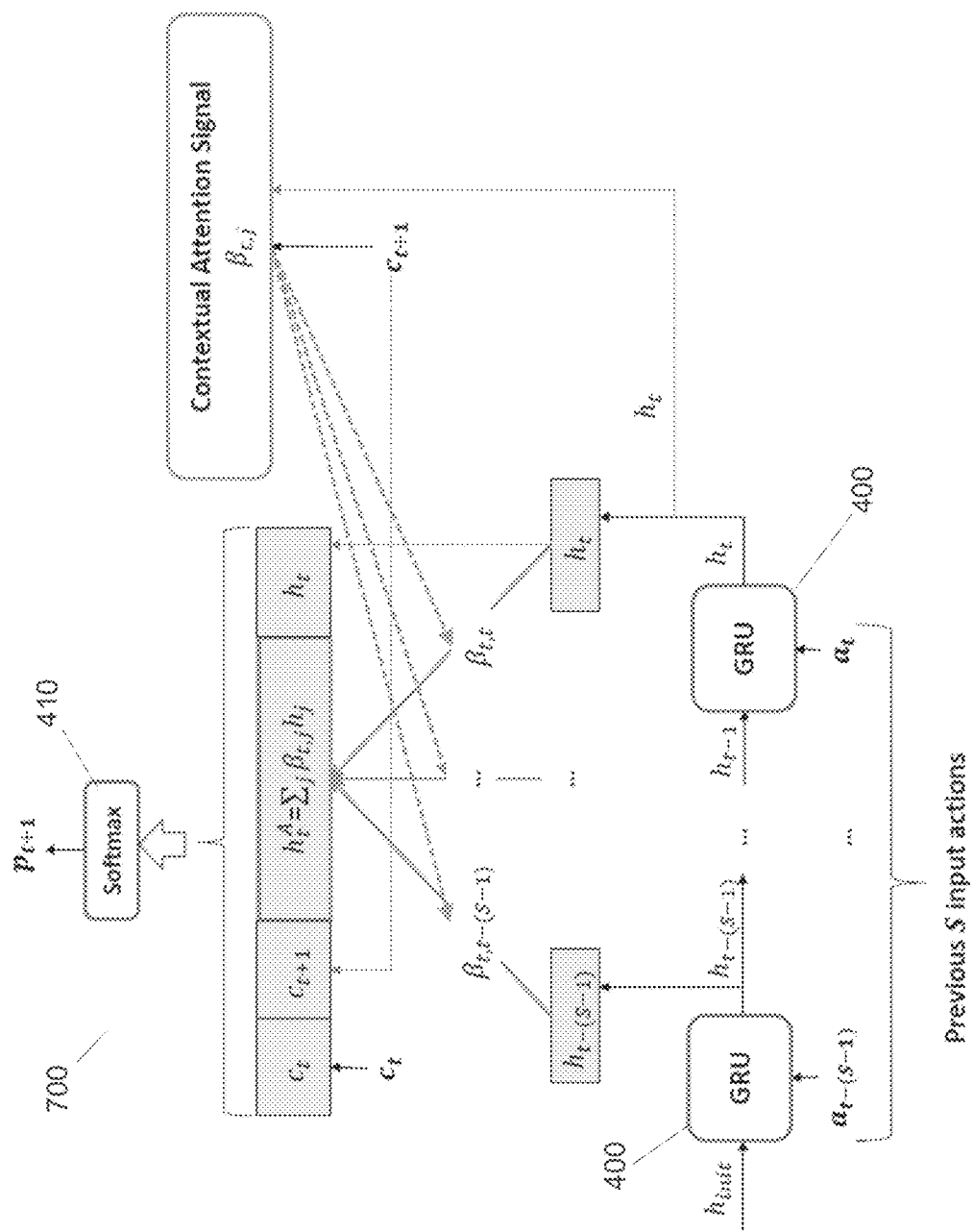
FIG. 7 shows an architecture of a contextual attention-based recurrent predictor model, according to some embodiments.

FIG. 7 shows an architecture of a contextual attention-based recurrent predictor model 700, according to some embodiments. In some embodiments, the contextual attention-based recurrent predictor model 700 builds on top of the joint training network architecture 600 (FIG. 6) approach to further improve prediction accuracy for personalized action prediction. The final hidden state $h_t$ produced by the GRU 400 in the joint training network architecture 600 approach provides a summarized representation of the user's sequential behavior over the past S actions. In many practical scenarios, the next action $a_{t+1}$ of the user is not necessarily influenced by the most recent user state $h_t$ or set of states; rather, the next action may be determined based on the user state several time steps earlier depending on the current context and the past states. For example, consider the following sequence of actions: a user (e.g., "Alice") looks up a restaurant (e.g., "Vito's") on YELP®, performs other smartphone actions such as messaging friends, browsing the restaurant website, checking email and then starts up a map navigation app for directions to Vito's on her smartphone after she begins driving. In this example, the map navigation action is most influenced by Alice's action of browsing Vito's on YELP® several timesteps earlier, and the current context of driving. An effective action prediction process should be able to take into account such long-term action dependencies based on the user's current context. In theory, recurrent models such as GRUs and LSTMs can handle such long-term contextual action dependencies. However, in practice, for long temporal sequences, attention models have been widely and effectively employed to improve the accuracy of recurrent models. As seen in the contextual attention-based recurrent predictor model 700, one key novelty is that the context vector is used as an additional input to determine attention weights over past GRU states of the user. In the above example, the contextual attention-based recurrent predictor model 700 additionally uses the current context of driving to assign a higher attention weight to Alice's state at the time when she looks up Vito's on YELP®.

In some embodiments, the contextual attention-based recurrent predictor model 700 achieves the highest prediction accuracy and is the most widely chosen prediction model across users for multiple prediction targets. The contextual attention-based recurrent predictor model 700 is chosen more frequently for users as K (the number of desired top-K predicted actions) increases; contextual attention on user state from multiple time steps in past improves the diversity and accuracy of the ranked list of predicted actions output by the contextual attention-based recurrent predictor model 700. In addition to improving accuracy, the contextual attention-based recurrent predictor model 700 makes the recurrent models more interpretable by providing a deeper insight into which past states of the user most influences the current action prediction.

In some embodiments, to predict the user action at time step t+1, the contextual attention-based recurrent predictor model 700 inputs the past/previous S user actions ($a_{t-(s-1)}$ to $a_t$) to a GRU 400, where S is the session length hyper-parameter. The GRU 400 produces a sequence of hidden states $h_{t-(s-1)}$ to $h_t$ corresponding to the past S actions. In one or more embodiments, as a first step, the contextual attention weight $\beta_{t,j}$ is computed for each hidden state $h_j$, where j denotes a time step from t−(S−1) to t. To compute $\beta_{t,j}$, first $q_{t,j}$ is computed as follows based on the final hidden state $h_t$, the hidden state $h_j$ at time step j, and the current context $c_{t+1}$:

$$q_{t,j} = v^T \sigma(D_1 h_j + D_2 h_t + D_3 c_{t+1}) \tag{9}$$

In equation 9, the weight matrices $D_1 \in R^{L \times H}$, $D_2 \in R^{L \times H}$, and $D_3 \in R^{L \times C}$ are used to transform the hidden state vectors $h_j$, $h_t$, and the context vector $c_{t+1}$ into a common latent space of dimension L, where H denotes the dimension of the GRU's hidden state, and C denotes the dimension of the context vector input. The matrix $v \in R^L$ is used to transform the latent vector of length L into the raw attention weight $q_{t,j}$. The final attention weights $\beta_{t,j}$ are computed by applying the softmax activation function 410 over the weights $q_{t,j}$ as shown below:

$$\beta_{t,j} = \frac{\exp(q_{t,j})}{\sum_{k=t-(S-1)}^{t} \exp(q_{t,k})} \tag{10}$$

In some embodiments, using the weights in β, the contextual attention-based recurrent predictor model 700 computes the attention-weighted hidden representation of the user's sequential behavior $h_t^A$ using equation 11. The attention-weighted representation improves action prediction by focusing on recent or past hidden states that are most relevant to the next action prediction for the user.

$$h_t^A = \Sigma_{j=t-(S-1)}^{t} \beta_{t,j} h_j \tag{11}$$

In some embodiments, the concatenated vector $[c_t; c_{t+1}; h_t^A; h_t]$ is computed by concatenating the final hidden state $h_t$, the attention-weighted hidden state $h_t^A$, and the context vectors $c_t$ and $c_{t+1}$; this concatenated vector is finally input to the softmax activation function 410 to output a probability distribution $p_{t+1}$ over the next action of the user. It is noted that in addition to concatenating $c_{t+1}$, concatenating $c_t$ improves prediction accuracy significantly for some users by adding additional previous context state information that is ignored by the joint training model 600 (FIG. 6) approach. Due to the high dimensionality of the concatenated vector $[c_t; c_{t+1}; h_t^A; h_t]$, in one or more embodiments simpler variants of the contextual attention-based recurrent predictor model 700 using concatenated vectors of $[c_{t+1}; h_t^A; h_t]$ and $[c_t; c_{t+1}; h_t]$ to mitigate overfitting. For each user, the model variant with the best prediction accuracy is chosen based on the overall approach of selecting the best model for each target domain (e.g., TV content domain, machine settings domain, voice assistant language domain, electronic device 120 app domain, etc.) and user.

Figure 8:
FIG. 8 shows an example of leveraged short term behavior and current context assigned attention weights for recent and past user behavior as captured by GRU states by the contextual attention-based recurrent predictor model, according to some embodiments.

FIG. 8 shows an example 800 of leveraged short term behavior and current context assigned attention weights 820 for recent and past user behavior (last 20 apps launched by a user 810 over time 307) as captured by GRU states by the contextual attention-based recurrent predictor model 700 (FIG. 7), according to some embodiments. Since the contextual attention models provide attention weights over past states of the user, these attention weights (e.g., attention weights 820 in the example 800) are useful in interpreting the reason behind a determined prediction. Example 800 shows example attention weights 820 for the POKEMON GO® app prediction for a sample user. It can be observed that a high attention weight on the messenger action a few timesteps earlier. This particular user typically coordinates and messages friends before playing POKEMON GO®.

In one or more embodiments, the context-aware recurrent models 320 (FIG. 3) may be employed, for example, suggesting or performing actions such as washer quick settings to/for users, instead of requiring the user to manually change numerous settings in the washer appliance (e.g., manually selecting multiple (e.g., up to six (6)) individual settings, such as washer temperature, spin cycles, rinse cycles, and course setting). Therefore, some embodiments predict preferred washer settings based on contextual and short term/long term behavior of each user. Further, the best model and learning window are selected for each user.

In some embodiments, the best model is chosen per user and prediction domain. In alternative embodiments, a different ensemble approach may be employed to combine the predictions from the various personal action prediction models for each user shown in FIG. 3, such as: (i) majority voting or, (ii) a stacked prediction approach that uses an additional neural network layer to predict the next action based on the prediction output from each personal action prediction model.

FIG. 9 shows a block diagram of a process 900 for predicting next actions on ubiquitous devices based on context-aware recurrent modeling, according to some embodiments. In some embodiments, block 910 of process 900 provides that for each model from multiple models (e.g., contextual GRU models 510 (FIG. 5A), 520 (FIG. 5B), 530 (FIG. 5C), joint training model 600 (FIG. 6), contextual attention-based recurrent predictor 700 model (FIG. 7), etc.) evaluating a model prediction accuracy based on a dataset of a user over a first time duration. The dataset includes a sequence of actions (e.g., actions 311, FIG. 3) with corresponding contexts (e.g., contexts information 310, FIG. 3) based on electronic device (e.g., electronic device(s) 120, FIG. 2, system 1000, FIG. 10, etc.) interactions. Each model is trained to predict a next action at a time point within the first time duration, based on a first behavior sequence over a first time period from the dataset before the time point, a second behavior sequence over a second time period from the dataset before the time point, and context at the time point. In block 920, process 900 selects a model from the multiple models based on its model prediction accuracy for the user based on a domain. In block 930, process 900 recommends an action to be initiated at a later time using an electronic device of the user using the selected model during a second time duration.

In some embodiments, process 900 may further include that evaluating a model prediction accuracy further includes observing an actual action taking place at the time point, and calculating the model prediction accuracy of the model based on difference between the predicted next action and the actual action. In one or more embodiments, the domain is determined based on a current context of the user. In some embodiments, each model of the multiple models provides a distinctive process of combining the first behavior sequence, the second behavior sequence and the context at the time point.

In one or more embodiments, in process 900 each model of the multiple models adapts importance among the first behavior sequence, the second behavior sequence and the context at the time point based on their interplay for each user. In some embodiments, process 900 may include resolving ambiguity of an utterance from the user for a voice assistant of an electronic device based on the next action.

In some embodiments, in process 900 the action includes performing selection of multiple electronic device settings (e.g., setting six (6) washing machine settings, opening a food delivery app, placing and paying for a food, etc.). In one or more embodiments, the next action differs from any behavior from a time period having a contextual data matching the current contextual data.

Figure 10:
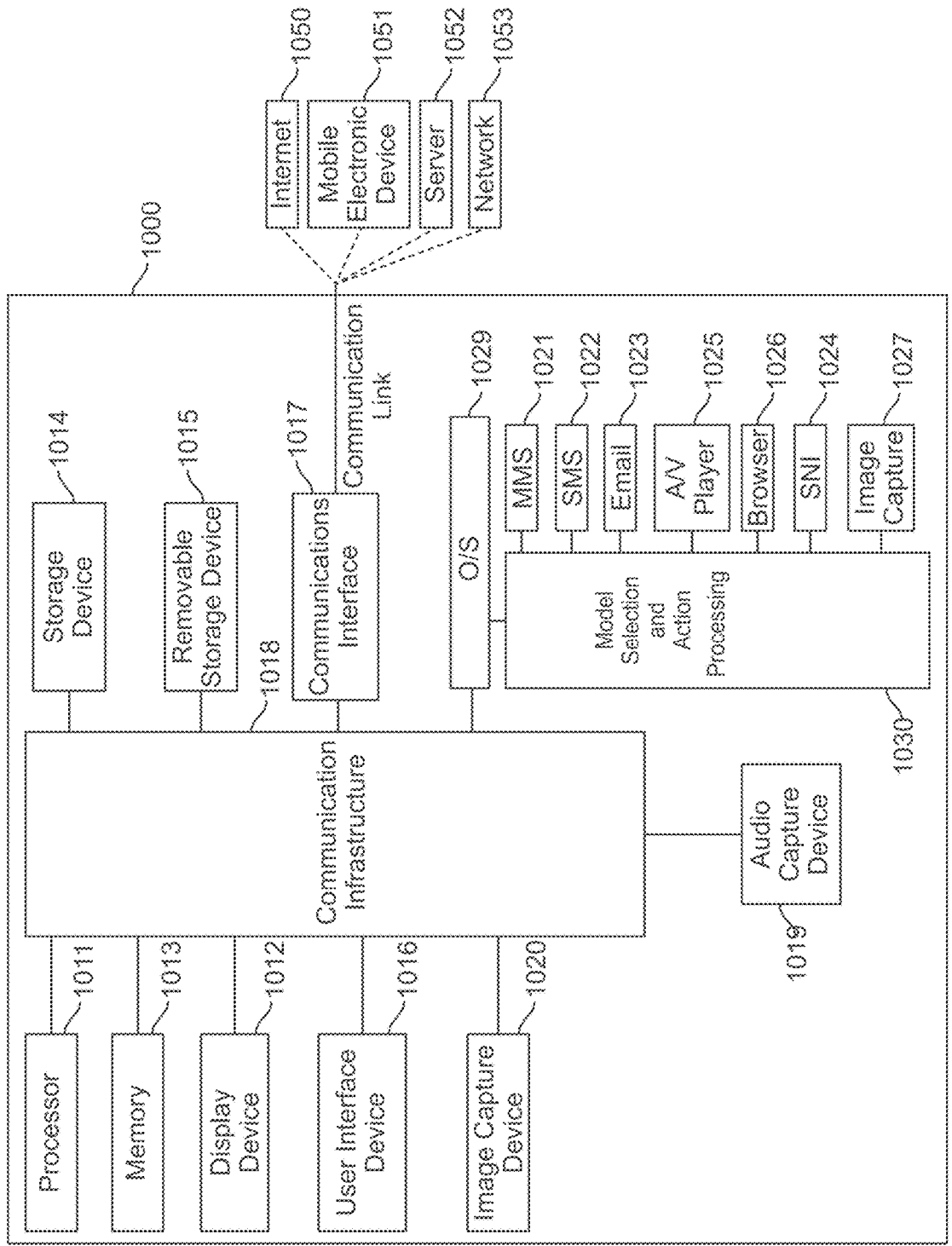
FIG. 10 is a high-level block diagram showing an information processing system comprising a computing system implementing one or more embodiments.

FIG. 10 is an exemplary high-level block diagram showing an information processing system comprising a computing system implementing one or more embodiments. The system 1000 includes one or more processors 1011 (e.g., ASIC, CPU, etc.), and may further include an electronic display device 1012 (for displaying graphics, text, and other data), a main memory 1013 (e.g., random access memory (RAM), cache devices, etc.), storage device 1014 (e.g., hard disk drive), removable storage device 1015 (e.g., removable storage drive, removable memory, a magnetic tape drive, optical disk drive, computer-readable medium having stored therein computer software and/or data), user interface device 1016 (e.g., keyboard, touch screen, keypad, pointing device), and a communication interface 1017 (e.g., modem, wireless transceiver (such as Wi-Fi, Cellular), a network interface (such as an Ethernet card), a communications port, or a PCMCIA slot and card).

The communication interface 1017 allows software and data to be transferred between the computer system and external devices through the Internet 1050, mobile electronic device 1051, a server 1052, a network 1053, etc. The system 1000 further includes a communications infrastructure 1018 (e.g., a communications bus, cross bar, or network) to which the aforementioned devices 1011 through 1017 are connected.

The information transferred via communications interface 1017 may be in the form of signals such as electronic, electromagnetic, optical, or other signals capable of being received by communications interface 1017, via a communication link that carries signals and may be implemented using wire or cable, fiber optics, a phone line, a cellular phone link, a radio frequency (RF) link, and/or other communication channels.

In one implementation of one or more embodiments in an electronic device (e.g., electronic device 120, FIG. 2), the system 1000 further includes an image capture device 1020, such as a camera 128 (FIG. 2), and an audio capture device 1019, such as a microphone 122 (FIG. 2). The system 1000 may further include application processing or processors as MMS 1021, SMS 1022, email 1023, social network interface (SNI) 1024, audio/video (AV) player 1025, web browser 1026, image capture 1027, etc.

In some embodiments, the system 1000 includes model selection and action processing 1030 that may implement processing similar as described regarding selection of a personal contextual-aware recurrent model and prediction processing 300 (FIG. 3), GRU 400 processing (FIG. 4), contextual GRU model processing 510 (FIG. 5A), 520 (FIG. 5B), 530 (FIG. 5C), joint training model 600 processing (FIG. 6), contextual attention-based recurrent predictor 700 model processing (FIG. 7) and process 900 (FIG. 9), as described above. In one embodiment, the model selection and action processing 1030 along with an operating system 1029 may be implemented as executable code residing in a memory of the system 1000. In another embodiment, the model selection and action processing 1030 may be provided in hardware, firmware, etc.

In one embodiment, the main memory 1013, storage device 1014 and removable storage device 1015, each by themselves or in any combination, may store instructions for the embodiments described above that may be executed by the one or more processors 1011.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for predicting next actions on ubiquitous devices based on context-aware recurrent modeling, comprising:
for each model from a plurality of context-aware recurrent models, evaluating a model prediction accuracy based on a dataset of a user over a first time duration, wherein:
the dataset comprises a sequence of actions with corresponding contexts based on electronic device interactions; and
each model is trained to predict a next action at a time point within the first time duration, based on a first behavior sequence over a first time period from the dataset before the time point, a second behavior sequence over a second time period from the dataset before the time point, context at the time point, and an attention weight is assigned to a user state before the time point based on current context of a user to improve the model prediction accuracy;
selecting a model from the plurality of context-aware recurrent models based on its model prediction accuracy for the user based on a domain; and
recommending an action to be initiated at a later time using an electronic device of the user using the selected model during a second time duration.

2. The method of claim 1, wherein evaluating the model prediction accuracy further comprising:
observing an actual action taking place at the time point; and
calculating the model prediction accuracy of the model based on difference between the predicted next action and the actual action.

3. The method of claim 1, wherein the domain is determined based on the current context of the user.

4. The method of claim 1, wherein each model of the plurality of context-aware recurrent models provides distinctive processing for combining the first behavior sequence, the second behavior sequence and the context at the time point.

5. The method of claim 4, wherein each model of the plurality of context-aware recurrent models adapts assignment of importance level among the first behavior sequence, the second behavior sequence and the context at the time point based on their interplay for each user.

6. The method of claim 1, further comprising resolving ambiguity of an utterance from the user for a voice assistant of the electronic device based on the next action.

7. The method of claim 1, wherein the action comprises performing selection of a plurality of electronic device settings.

8. The method of claim 1, wherein the next action differs from any behavior from a time period having a contextual data matching the current contextual data.

9. An electronic device comprising:
a memory storing instructions; and
at least one processor executing the instructions including a process configured to:
for each model from a plurality of context-aware recurrent models, evaluate a model prediction accuracy based on a dataset of a user over a first time duration, wherein:
the dataset comprises a sequence of actions with corresponding contexts based on electronic device interactions, and
each model is trained to predict a next action at a time point within the first time duration, based on a first behavior sequence over a first time period from the dataset before the time point, a second behavior sequence over a second time period from the dataset before the time point, context at the time point, and an attention weight is assigned to a user state before the time point based on current context of a user to improve the model prediction accuracy;
select a model from the plurality of context-aware recurrent models based on its model prediction accuracy for the user based on a domain; and
recommend an action to be initiated at a later time using the electronic device using the selected model during a second time duration.

10. The electronic device of claim 9, wherein the process is further configured to:
observe an actual action taking place at the time point; and
calculate the model prediction accuracy of the model based on difference between the predicted next action and the actual action.

11. The electronic device of claim 9, wherein the domain is determined based on the current context of the user.

12. The electronic device of claim 9, wherein each model of the plurality of context-aware recurrent models provides a distinctive correlation of the first behavior sequence, the second behavior sequence and the context at the time point.

13. The electronic device of claim 9, wherein each model of the plurality of context-aware recurrent models adapts assignment of importance level among the first behavior sequence, the second behavior sequence and the context at the time point based on their interplay.

14. The electronic device of claim 9, wherein the process is further configured to:
resolve ambiguity of an utterance from the user for a voice assistant of the electronic device based on the next task.

15. The electronic device of claim 9, wherein the action comprises performing selection of a plurality of electronic device settings.

16. The electronic device of claim 9, wherein the next action differs from any behavior from a time period having a contextual data matching the current contextual data.

17. A non-transitory processor-readable medium that includes a program that when executed by a processor performing a method for predicting next actions on ubiquitous devices based on context-aware recurrent modeling comprising:
for each model from a plurality of context-aware recurrent models, evaluating a model prediction accuracy based on a dataset of a user over a first time duration, wherein:
the dataset comprises a sequence of actions with corresponding contexts based on electronic device interactions, and
each model is trained to predict a next action at a time point within the first time duration, based on a first behavior sequence over a first time period from the dataset before the time point, a second behavior sequence over a second time period from the dataset before the time point, context at the time point, and an attention weight is assigned to a user state before the time point based on current context of a user to improve the model prediction accuracy;

selecting a model from the plurality of context-aware recurrent models based on its model prediction accuracy for the user based on a domain; and recommending an action to be initiated at a later time using an electronic device of the user using the selected model during a second time duration.

18. The non-transitory processor-readable medium of claim 17, wherein:

evaluating a model prediction accuracy further comprising:

observing an actual action taking place at the time point; and calculating the model prediction accuracy of the model based on difference between the predicted next action and the actual action;

the domain is determined based on the current context of the user; and each model of the plurality of context-aware recurrent models provides a distinctive correlation of the first behavior sequence, the second behavior sequence and the context at the time point.

19. The non-transitory processor-readable medium of claim 17, wherein:

each model of the plurality of context-aware recurrent models adapts assignment of importance level among the first behavior sequence, the second behavior sequence and the context at the time point based on their interplay;

the next action differs from any behavior from a time period having a contextual data matching the current contextual data; and the action comprises performing selection of a plurality of electronic device settings.

20. The non-transitory processor-readable medium of claim 17, wherein the method further comprising:

resolving ambiguity of an utterance from the user for a voice assistant of the electronic device based on the next task.

* * * * *